United States Patent
Koeppen et al.

[11] Patent Number: 6,122,422
[45] Date of Patent: Sep. 19, 2000

[54] ARTICLE COMPRISING A DISPERSIVE WAVEGUIDE TAP

[75] Inventors: Christopher Stephen Koeppen, Yardley, Pa.; Jefferson Lynn Wagener, Charlottesville, Va.

[73] Assignee: Lucent Technologies Inc., Murray Hill, N.J.

[21] Appl. No.: 09/093,323

[22] Filed: Jun. 8, 1998

[51] Int. Cl.[7] ................................................ G02B 6/26
[52] U.S. Cl. ............................ 385/48; 385/37; 385/24; 359/124; 359/130
[58] Field of Search ............................ 385/48, 37, 24; 359/124, 130

[56] References Cited

U.S. PATENT DOCUMENTS

| | | | |
|---|---|---|---|
| 4,343,532 | 8/1982 | Palmer | 350/96.19 |
| 4,749,248 | 6/1988 | Aberson | 350/96.19 |
| 4,912,523 | 3/1990 | Refi | 455/607 |
| 5,042,897 | 8/1991 | Meltz | 385/37 |
| 5,251,278 | 10/1993 | Samborsky | 385/48 |
| 5,602,665 | 2/1997 | Asako | 359/152 |
| 5,689,594 | 11/1997 | Mao | 385/24 |
| 5,742,416 | 4/1998 | Mizrahi | 359/134 |
| 6,002,822 | 12/1999 | Strasser | 385/48 |
| 6,016,375 | 1/2000 | Hill | 385/37 |

OTHER PUBLICATIONS

"Channel Monitoring in WDM Networks: a Systems Perspective", by G. Livescu, Technical Digest Series, vol. 4, Integrated Research, Victoria, B.C., Canada, pp. 43–45.

"Fiber Grating Optical Spectrum Analyzer Tap", by J. L. Wagener et al., ECOC '97, Sep. 1997, Conference Publication No. 448, pp. 65–68.

"Bidirectional 10–channel 2.5 Gbit/s WDM Transmission Over 350 km Using 76 nm (1531–1607 nm) Gain–band Bidirectional Erbium–doped Fibre Amplifiers", by K.–I. Suzuki et al., *Electronics Letters*, vol. 33 (23), Nov. 6, 1997, pp. 1967–1968.

"Increasing Repeater Span in High–Speed Bidirectional WDM Transmission Systems Using A New Bidirectional EDFA Configuration", by F. Khaleghi et al., *IEEE Photonics Technology Letters*, vol. 8 (9), Sep. 1966, pp. 1252–1254.

"Planar Waveguide Grating Optical Spectrum Analyzer", by C. K. Madsen et al., 1998 Technical Digest Series, vol. 4, Integrated Photonics Research, Victoria, B.C., Canada, pp. IMG4–1/99—IMG4–3/101.

*Primary Examiner*—Cassandra Spyrou
*Assistant Examiner*—Leo Boutsikaris
*Attorney, Agent, or Firm*—Eugen E. Pacher

[57] ABSTRACT

A bidirectional waveguide tap is disclosed. The tap comprises an appropriately blazed grating in the waveguide, with coupling means in optical co-operation with the waveguide causing transfer of light from a guided mode in the waveguide to a radiation mode. Radiation mode light of a given wavelength and propagation direction is brought to a focus on a predetermined region of utilization means, e.g., an array of photosensors.

11 Claims, 2 Drawing Sheets

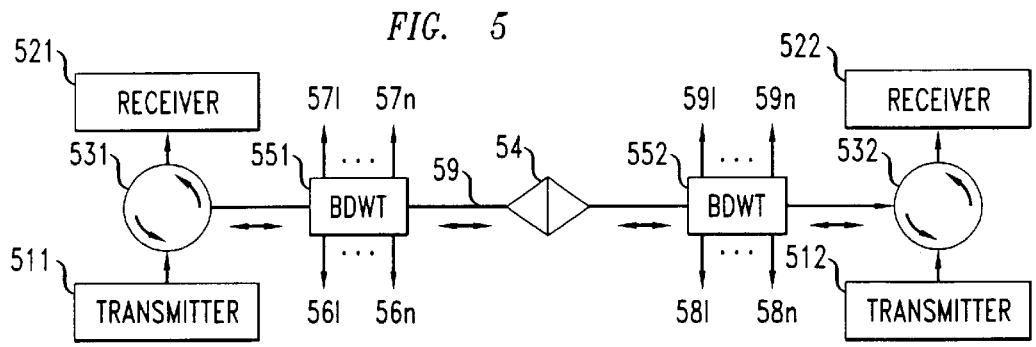
FIG. 5
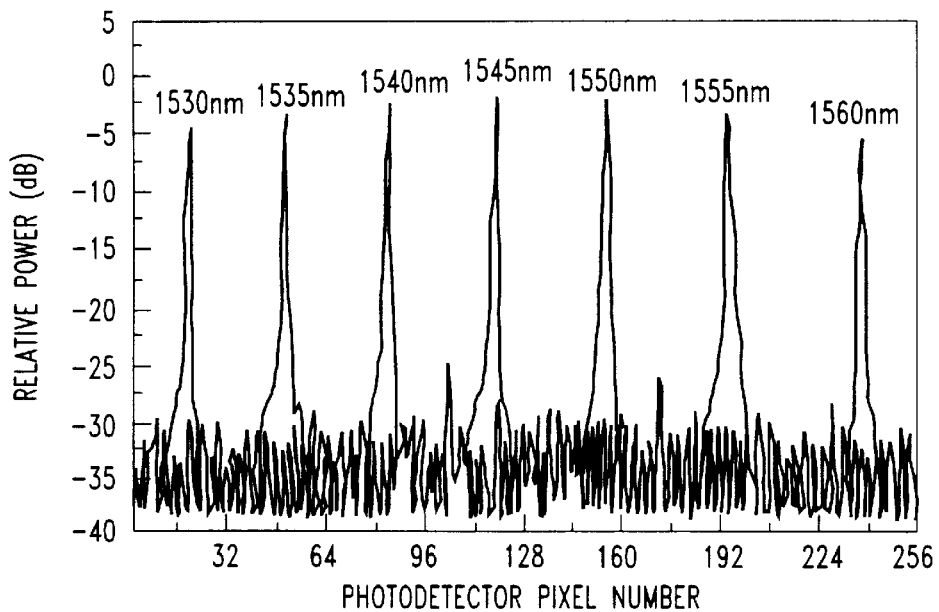
FIG. 6
FIG. 7

ARTICLE COMPRISING A DISPERSIVE WAVEGUIDE TAP

FIELD OF THE INVENTION

This invention pertains to optical waveguide (e.g., optical fiber) communication systems that comprise a dispersive waveguide tap for, e.g., network monitoring.

BACKGROUND

As is well known, optical waveguide communication systems typically require network monitoring apparatus that provides the systems operator with information on the status of the system. See, for instance, G. Livescu, OSA 1998, Technical Digest Series, Vol. 4, Integrated Research, Victoria, B.C., Canada, pp. 43–45.

It is also well known that most optical waveguide communication systems are functionally bidirectional, but with signal flow in a given waveguide being in one direction only, i.e., a given waveguide link is unidirectional. See, for instance, the above cited Livescu reference. Herein we will refer to such systems as "bidirectional systems with unidirectional links" or "BS/ULs".

Monitoring apparatus for use in BS/ULs is known. Such systems may include one or more of optical spectrum analyzers, multi-wavelength meters, tunable Fabry-Perot cavity devices, tunable acousto-optic devices, waveguide arrays, or bulk grating spectrometers. Recently, a new device that is useful for monitoring applications in BS/ULs was disclosed. It will be referred to as a "unidirectional dispersive waveguide tap" or "UDWT". See co-assigned U.S. patent applications Ser. No. 08/741,439, filed Oct. 31, 1996 now U.S. Pat. No. 5,832,156, and an application with attorney docket number T. A. Strasser 18-12, filed Jun. 1, 1998 now U.S. Pat. No. 6,002,822, a continuation-in-part application of the referenced '439 application. See also U.S. patent application Ser. No. 08/978,352 now U.S. Pat. No. 5,850,302, filed Nov. 25, 1997, a division of the above-referenced '439 application, and U.S. patent application with attorney docket number T. A. Strasser 19-13 Ser. No. 09/088,567, filed Jun. 1, 1998, a continuation-in-part application of the above-referenced '352 application. See also J. L. Wagener et al., ECOC 97, September 1997, Conference Publication No. 448, pp. 65–68; and C. K. Madsen et al., 1998 Technical Digest Series Vol. 4, Integrated Photonics Research, Mar. 20–Apr. 1, 1998, Victoria, B.C., Canada. All of the above cited applications and references are incorporated herein by reference.

Most optical waveguide communication systems are BS/UL systems. However, truly bidirectional waveguide communication systems (i.e., systems wherein at least a portion of a given waveguide link carries signals in both directions) are also of interest. See, for instance, K. I. Suzuki et al., *Electronics Letters*, Vol. 33(23), November 1997, pp. 1967–1968; F. Khaleghi et al., *IEEE Photonics Technology Letters*, Vol. 8(9), September 1996, pp. 1252–1254; U.S. Pat. Nos. 5,742,416; 5,689,594; and 5,602,665. These references disclose bidirectional systems, but do not disclose or suggest any bidirectional monitoring devices. For instance, FIG. 2 of the Suzuki et al. paper shows a WDM system wherein signals propagate in both directions over the fiber link between the two circulators, but does not show any bidirectional monitoring device. Truly bidirectional waveguide communication systems will herein be referred to as "bidirectional" systems.

Monitoring apparatus is needed in bidirectional waveguide communication systems for substantially the same reasons as in BS/UL systems. However, in a bidirectional system monitoring apparatus advantageously is bidirectional, i.e., responsive to the signal stream in one direction as well as to the signal stream in the opposite direction, since availability of bidirectional monitoring apparatus can translate into simpler (and thus cheaper and/or more reliable) bidirectional systems. However, few if any bidirectional monitoring devices are known to date.

In response to the need for bidirectional monitoring devices, this application discloses such a device, and bidirectional systems that comprise such a device.

Glossary and Definitions

By "guided modes" we mean herein the propagating modes in the waveguide. The guided mode in a single mode conventional optical fiber is the $LP_{01}$ mode.

By "cladding modes", or "bound cladding modes" we mean herein optical modes of the waveguide structure that have an effective refractive index less than the refractive index of the cladding material of the waveguide. These modes are bound, in the sense that the optical power in these modes is always localized around the waveguide, and is not spreading out in a direction orthogonal to the propagation direction.

By "radiation modes" we mean herein optical modes that are not completely localized to the waveguide structure. Radiation modes spread away from the waveguide structure, such that at some point along the length of the waveguide there is an arbitrarily small amount of optical power located in the waveguide structure.

By a "non-guided mode" we mean herein a mode other than a guided mode, e.g., a cladding mode or a radiation mode.

A refractive index grating herein is "chirped" if the (optical) repeat distance $\Lambda$ of the index perturbations is not constant as a function of the axial coordinate z of the fiber, i.e., if $\Lambda=\Lambda(z)$.

A refractive index grating herein is "blazed" if the plane of the index perturbations in the waveguide is not perpendicular to the propagation direction of the guided mode or modes.

SUMMARY OF THE INVENTION

In a broad aspect the invention is embodied in an article that comprises a bidirectional dispersive waveguide tap (also to be referred to as a "BDWT"). Exemplarily the article is a bidirectional optical waveguide (frequently optical fiber) communication system.

More specifically, the article comprises an optical waveguide (exemplarily an optical fiber). As is conventional, the waveguide is adapted for guiding light of an appropriate wavelength (e.g., infrared radiation of approximate wavelength 1.5 μm; the term "light" is used for convenience's sake only and does not imply any limitation to the visible part of the electromagnetic spectrum) in a first direction as well as in a second direction opposite to the first direction. The article also comprises a tap for coupling from the optical waveguide at least some of the light that is propagating (during operation of the system) in the optical waveguide in the first direction. The tap comprises a blazed refractive index grating in the optical waveguide (typically the core), the tap being selected to direct at least some of the light that is propagating in the first direction in the waveguide from the optical waveguide to a predetermined region of first utilization means (e.g., a detector array, or an array of optical fibers).

Significantly, the blazed refractive index grating in the optical waveguide furthermore is selected to direct at least some of the light that is propagating (during operation of the system) in the second direction from the optical waveguide to a predetermined region of second utilization means. The tap thus is a bidirectional tap.

In currently preferred embodiments, the blazed refractive index grating is selected to direct at least some of the light that is propagating in the first direction in the waveguide from a first guided mode into a first non-guided mode, and to direct at least some of the light that is propagating in the second direction in the waveguide from a second guided mode into a second non-guided mode. Furthermore, the article comprises coupling means (e.g., an appropriately shaped glass member or members) that are in optical co-operation with the optical waveguide such that the first and second non-guided modes are first and second radiation modes, respectively. Still furthermore, the article comprises focusing means, e.g., a lens, a curved mirror, a diffraction grating, a volume hologram or a chirp in the blazed grating, selected to bring the light in the first radiation mode substantially to a focus on the predetermined region of the first utilization means, and to bring the light in the second radiation mode substantially to a focus on the predetermined region of the second utilization means.

BRIEF DESCRIPTION OF THE DRAWINGS

FIG. 5 schematically shows an exemplary bidirectional system with BDWT; and

FIGS. 6 and 7 show experimental data for an exemplary BDWT.

The drawings are not intended to be to scale or proportional. Like or analogous elements in different drawings are generally designated by the same numerals.

DETAILED DESCRIPTION

Figure 1:
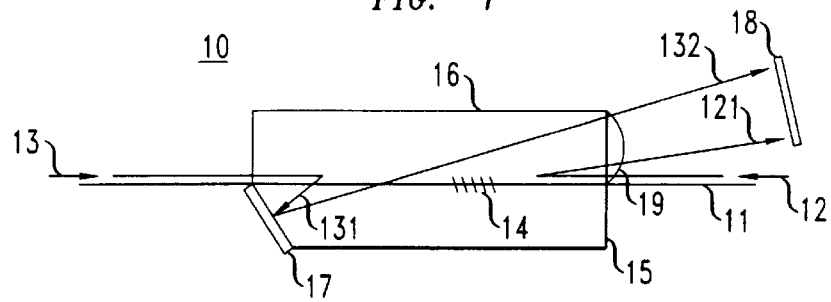
FIGS. 1–4 schematically depict exemplary embodiments of BDWTs according to the invention.

FIG. 1 schematically depicts an exemplary BDWT 10, wherein numeral 11 refers to a length of optical fiber (exemplarily a part of an optical fiber transmission link), and numerals 12 and 13 indicate the direction of propagation of light in the fiber. In FIG. 1, numeral 14 refers to a blazed refractive index Bragg grating in fiber 11, numeral 121 refers to light that was incident on grating 14 from the right ("right incident light"), numeral 131 refers to light that was incident on the grating from the left ("left incident light") and is propagating towards mirror 17, and numeral 132 refers to light that is reflected by mirror 17 and is propagating towards detector array 18. Numerals 15 and 16 refer to a first and a second transparent member, respectively. Both members typically are substantially index-matched with the optical fiber, and are joined together, with the fiber therebetween, by appropriate index-matched adhesive means, e.g., transparent epoxy. Light 121 and 132 that is propagating towards the detector array passes through conventional lens 19. The lens serves to bring light 132 to a focus at a different location of the detector array from the location at which light 121 is brought to a focus. It will be understood that each of light 12 and 13 typically comprise a multiplicity of different wavelengths (each separate wavelength constituting a communications channel), and that the different wavelengths of light 121 (as well as the wavelengths of light 131) are directed by the grating into different directions. Consequently the different wavelengths are focused at different positions along the detector array, resulting in electrical signals (not shown) from the array that are indicative of the intensity of the light at given wavelengths and propagating in the fiber in a given direction.

The directional designations "right" and "left" refer only to the drawing, and do not have any significance in actual embodiments of the invention.

Figure 2:
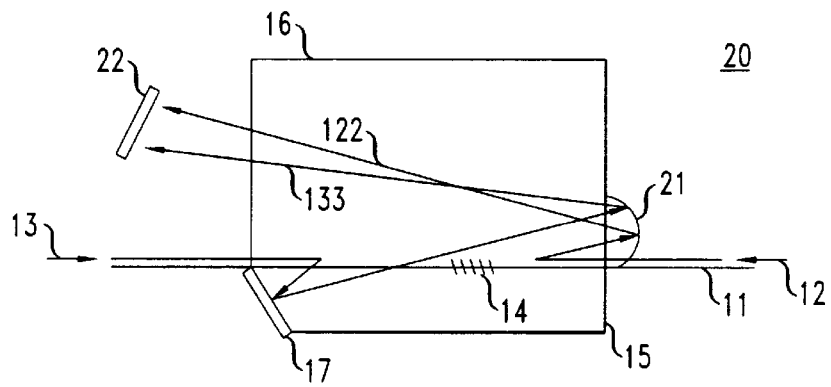

The general principles of a BDWT according to the invention can be embodied in a variety of devices of different topology. For instance, FIG. 2 schematically depicts a BDWT 20 having detector array 22 on the opposite side of the tap, as compared to BDWT 10. In FIG. 2, numeral 21 refers to a concave mirror selected to bring radiation 122 and 133 to respective foci.

Figure 3:
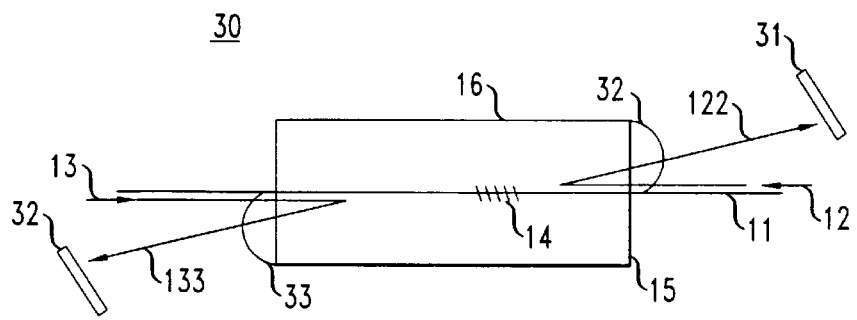

FIG. 3 schematically depicts a further exemplary embodiment of the invention, wherein BDWT 30 is substantially left/right symmetric, with lenses 32 and 33 focusing light 122 and 133 respectively onto predetermined regions of detector arrays 31 and 32.

Figure 4:
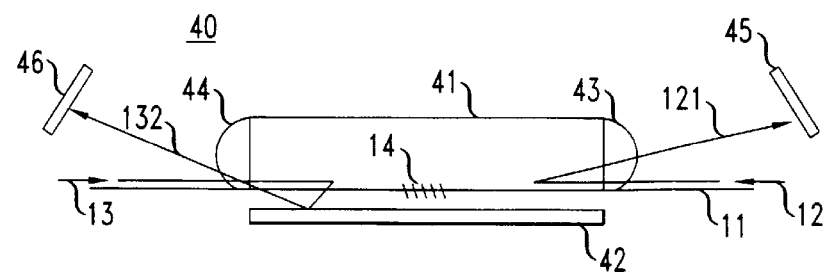

FIG. 4 schematically shows a still further exemplary BDWT 40 according to the invention, wherein numeral 41 refers to a substantially index matched transparent member, 42 refers to a reflector, 43 and 44 refer to lenses, and 45 and 46 refer to detector arrays.

Regardless of the topology of the BDWT, the tap comprises a single blazed refractive index grating that is selected to direct first direction light in a direction different from second direction light. The blaze angle of the grating is selected such that, in air, the grating couples single mode (typically $LP_{01}$) light of the relevant wavelength into one or more cladding modes. Exemplarily, the blaze angle is at most 15°, since taps with larger blaze angles generally exhibit undesirably large polarization dependence. In preferred embodiments the blaze angle is 10° or less. The coupling means, in optical cooperation with the grating, are selected to change the optical properties of the tap such that the grating couples the single mode light into radiation modes. The strength of the grating is selected to meet requirements. The strength can vary from very weak (e.g., 5% of the single mode radiation coupled into cladding modes) to moderate (e.g., 50%) to very high (e.g., 100%). Strength control is obtained by conventional means.

Although a BDWT according to the invention can be used in single channel bidirectional systems, it is advantageously used in multichannel (wavelength division multiplexed) bidirectional systems, due to the dispersive characteristic of the blazed grating.

The dispersion relation of a blazed (unchirped) grating is $$\lambda = n\Lambda(1+\cos\theta),$$

where $\lambda$ is the wavelength of light, n is the refractive index of the fiber, $\Lambda$ is the blazed Bragg grating periodicity, and $\theta$ is the propagation angle, relative to the fiber axis, of the light of wavelength $\lambda$. This can also be expressed as $$\Delta\lambda/\Delta\theta = (\lambda \sin\theta)/(1+\cos\theta)$$

In a BDWT according to the invention, the tap dispersively extracts a desired amount of light out of the fiber. This light could be caused to be directly incident on utilization means. However, in preferred embodiments focusing means are provided that substantially focus the light onto the utilization means. Such focusing means can be any means that can bring about the desired focusing, e.g., a lens (cylindrical or non-cylindrical, a diffraction grating, a volume hologram, or a curved mirror). They can also be a chirp in the blazed gratings. By adding chirp to the grating periodicity, a given wavelength of light is tapped out of the waveguide at different angles along the length of the grating. Even with a chirped blazed grating, a lens, mirror or other appropriate focusing element can be used to further enhance the focusing. Further detail on the use of chirped blazed gratings can be found in above-cited '439 patent application.

It is not required that the focusing means bring the respective wavelengths of light to a perfect focus at the utilization means, provided that cross talk is at an acceptable level. Exemplarily, focusing is such that the cross talk between two adjacent detector pixels is at most −10 dB.

BDWTs according to the invention can be embodied in a variety of ways. For instance, the waveguide can be optical fiber (typically single mode), a channel waveguide or a planar waveguide. The coupling means can be substantially any optically transparent (at the signal wavelengths) material that has a refractive index that is substantially matched (e.g., within about ±10%) to the refractive index of the waveguide. The reflecting element (e.g., elements 17 in FIGS. 1 and 2; element 21 in FIG. 2, element 42 in FIG. 4) can be a flat mirror, a spherically concave or convex mirror, a cylindrically concave or convex mirror, depending on the topology of the device. The focusing element can be, for instance, a spherical or cylindrical lens, a concave mirror, a chirped blazed grating, or any other suitable focusing element or combination of elements. The utilization means could be a linear or 2-dimensional detector array, or a single detector scanned across the dispersed light. Such arrays are commercially available. In such an array, different detection elements are associated with signals traveling in the waveguide in the first and second directions, respectively, and with different wavelengths. The detection elements could be interleaved, or one region of the array could be used for first direction signals, and another region could be used for second direction signals. The utilization means could also comprise a multiplicity of optical waveguides, with light of a particular wavelength being focused on one or another waveguide, depending on the propagation direction.

As is evident from the above description, the BDWT according to the invention can act as an optical spectrometer that also distinguishes between propagation directions of the light in the optical waveguide. Such a device has many applications in a bidirectional optical waveguide communication system. Among them are determination of channel wavelength and power, of optical signal to noise ratio, of laser drift, of optical amplifier gain spectrum and tilt, and of channel degradation or failure. Those skilled in the art will be readily able to adapt the BDWT according to the invention to these and other uses.

FIG. 5 schematically shows an exemplary bidirectional optical waveguide communication system with bidirectional monitoring devices. Transmitter 511 and receiver 521 are substantially co-located at a first location, and transmitter 512 and receiver 522 are substantially co-located at a second location. The transmitters and receivers can be conventional, typically adapted for operation in an n-channel WDM system. Circulators 531 and 532 typically are substantially co-located with the respective transmitter and receiver, and serve to put outgoing signals onto bidirectional waveguide link 58, and to provide incoming signals to the respective receiver. Between the circulators is disposed bidirection optical amplifier 54, as well as BDWTs 551 and 552. Each BDWT has one or two sets of (typically electrical) outputs, designated 561-56n and 571-57n, and 581-58n and 591-59n, respectively. For each BDWT, one set of outputs is derived from the right-incident signals, and the other is derived from the left-incident signals. A given output of a given set is associated with a given channel of the communication system, exemplarily being proportional to the signal power in the channel. The various outputs of the BDWTs are provided to appropriate apparatus (not shown) for system monitoring or control, exemplarily feedback means.

The above described system is exemplary only, and BDWTs according to the invention can be advantageously used in a variety of bidirectional optical waveguide systems, as will be evident to those skilled in the art. For instance, such BDWTs could be advantageously incorporated into the WDM system of FIG. 2 of the above referenced paper by Suzuki et al., or into the WDM system of FIG. 1 of U.S. Pat. No. 5,742,416, in all cases to perform one or more system monitoring or control functions.

EXAMPLE

In conventional, commercially available 5D® single mode silica-based fiber was formed an unchirped blazed Bragg grating by a conventional technique. The grating had a length of 10 mm, blaze angle 9°, and had a wavelength response centered on 1540 nm, with approximately 40 nm full width at half maximum. The strength of the grating was such that about 20% of single mode radiation of 1540 nm wavelength was tapped out of the fiber. Two fused silica blocks, shaped substantially as shown in FIG. 1, were butted against the fiber grating, and index matching fluid (Cargill oil, with index of refraction n=1.44 at 1540 nm) was infiltrated between the blocks. The blocks had dimensions 10×3×1 cm, with one short side of the lower block cut and polished at a 60° angle. A conventional high reflectivity dielectric mirror was formed on the angled plane and served to redirect the left-incident light towards the detector array. A plano-convex cylindrical lens with focal length 100 mm served to focus both left- and right-incident light (radiation modes) onto a 256 element linear InGaAs detector array. Each detector element was 30 μm in width and 250 μm in length. Such arrays are conventional and commercially available, e.g., from EG&G Optoelectronics, Inc., Montogmeryville, Pa. The array covered a 35 nm wide range of wavelengths, with each detector element corresponding to a 0.13 nm wide spectral region.

The thus produced BDWT was tested as follows. Laser radiation from conventional Hewlett Packard external cavity lasers (ECLs) was coupled into the optical fiber with the grating therein, to give a right-incident and left-incident signal. FIG. 6 shows the detector response for right-incident radiation over the range 1530–1560 nm. The primary peaks correspond to the laser lines. The secondary peaks are believed due to stray reflections, and can be reduced or eliminated by careful design. As can be seen from FIG. 6, different detector pixels correspond to different wavelengths, and hence map the spectrum of the right incident light. FIG. 7 shows corresponding results for the left-incident light. The results clearly demonstrate that the exemplary tap is a bidirectional tap.

The invention claimed is:

1. An article comprising
   a) an optical waveguide adapted for guiding light of a predetermined wavelength in a first direction as well as for guiding light of the predetermined wavelength in a second direction opposite the first direction; and
   b) a tap for coupling from the optical waveguide at least some of the light that is propagating in the optical waveguide in the first direction, and for coupling from the optical waveguide at least some of the light that is propagating in the optical waveguide in the second direction;
   c) the optical waveguide is a single mode optical waveguide adapted for guiding fundamental mode light in the first and the second direction;

d) the tap is a bi-directional tap that comprises a blazed refractive index grating in the optical waveguide;

e) the blazed refractive index grating is selected to direct at least some of the light that is propagating in the first direction in the waveguide from the first fundamental mode into at least one first non-guided mode, and to direct at least some of the light that is propagating in the second direction in the waveguide from a second fundamental mode into at least one second non-guided mode;

f) the article comprises at least one coupling element that is in optical co-operation with the optical waveguide such that the first and second non-guided modes respectively are first and second radiation modes; and g) the article comprises at least one focusing element selected to bring the light in the first radiation mode substantially to a focus on a predetermined region of a first utilization element, and to bring the light in the second radiation mode substantially to a focus on a predetermined region of a second utilization element.

2. Article according to claim 1, wherein a blaze angle of said blazed refractive index grating is at most 15°.

3. Article according to claim 1, wherein said at least one focusing element is selected from the group consisting of cylindrical lenses, non-cylindrical lenses, diffraction gratings, volume holograms, non-planar mirrors, chirp of the blazed refractive index grating, and combinations thereof.

4. Article according to claim 1, wherein said optical waveguide is an optical fiber.

5. Article according to claim 1, wherein said predetermined wavelength is about 1.5 $\mu$m.

6. Article according to claim 1, wherein at least one of said first and second utilization elements comprises a light-sensitive semiconductor device.

7. Article according to claim 6, wherein said light-sensitive semiconductor device comprises a multiplicity of spaced-apart light-sensitive regions.

8. Article according to claim 1, wherein said at least one coupling element is substantially index-matched to said optical waveguide.

9. Article according to claim 1, wherein the article is a bidirectional optical waveguide communication system comprising first and second transmitters, first and second receivers, and an optical waveguide adapted for guiding light in the first direction from the first transmitter to the second receiver, and also adapted for guiding light in the second direction from the second transmitter to the first receiver, wherein said bidirectional tap is situated in said optical waveguide.

10. Article according to claim 9, wherein the at least one utilization element of said bi-directional tap has an output that is indicative of an operating parameter of said bi-directional optical waveguide communication system.

11. Bidirectional optical waveguide communication system according to claim 9, wherein each of said light being guided in the first and second direction comprises a multiplicity of predetermined wavelengths.

* * * * *